United States Patent
Mashimo (10) Patent No.: US 7,502,287 B2
(45) Date of Patent: Mar. 10, 2009

(54) OPTICAL DISK APPARATUS

(75) Inventor: Akira Mashimo, Tokorozawa (JP)

(73) Assignee: TEAC Corporation, Tama-shi (JP)

( * ) Notice: Subject to any disclaimer, the term of this patent is extended or adjusted under 35 U.S.C. 154(b) by 560 days.

(21) Appl. No.: 11/235,789

(22) Filed: Sep. 27, 2005

(65) Prior Publication Data

US 2006/0077820 A1    Apr. 13, 2006

(30) Foreign Application Priority Data

Sep. 29, 2004   (JP)  ............... 2004-285451

(51) Int. Cl.
*G11B 5/09* (2006.01)
(52) U.S. Cl. .................. 369/47.1; 369/47.48
(58) Field of Classification Search ............... 369/47.1, 369/47.48

See application file for complete search history.

(56) References Cited

U.S. PATENT DOCUMENTS

| | | | | |
|---|---|---|---|---|
| 6,111,831 A * | 8/2000 | Alon et al. | ............. | 369/47.16 |
| 6,674,707 B2 * | 1/2004 | Ogura et al. | ............. | 369/59.22 |
| 6,687,206 B1 * | 2/2004 | Masui | ............. | 369/47.19 |
| 6,757,233 B2 * | 6/2004 | Akabane et al. | ............. | 369/59.17 |
| 2003/0053389 A1 * | 3/2003 | Mashimo | ............. | 369/59.11 |

FOREIGN PATENT DOCUMENTS

| | | |
|---|---|---|
| JP | 2000-339694 | 12/2000 |
| JP | 2001-266348 | 9/2001 |
| JP | 2002-279642 | 9/2002 |
| JP | 2003-59184 | 2/2003 |
| JP | 2003-91819 | 3/2003 |

* cited by examiner

*Primary Examiner*—Andrea L Wellington
*Assistant Examiner*—Aneeta Patankar
(74) *Attorney, Agent, or Firm*—Christensen O'Connor Johnson Kindness PLLC (57) ABSTRACT

An optical disk apparatus for recording data on an optical disk having a land pre-pit (LPP). An encoder of a DVD-R/RW drive records data while inserting synchronization information having a length of 14T at the top of a synchronous frame. The encoder sets synchronization information of the i-th frame (wherein i is an integer which is 0 or greater) and the (i+1)th frame of a plurality of consecutive frames to either a mark or a space such that each DSV is minimized. The encoder sets the synchronization information of the (i+2)th frame such that the polarity of the synchronization information of the (i+2)th frame is opposite to the polarity of the synchronization information of the i-th frame, and sets the synchronization information of (i+3)th frame such that the polarity of the synchronization information of (i+3)th frame is opposite to the polarity of the synchronization information of the (i+1)th frame. In this manner, the synchronization information of one of two frames, whether they are two odd frames or two even frames, is always set to a space.

6 Claims, 9 Drawing Sheets

OPTICAL DISK APPARATUS

BACKGROUND OF THE INVENTION

1. Field of the Invention

The present invention relates to an optical disk apparatus, and more particularly to an apparatus which performs data recording/reproducing with respect to an optical disk having a pre-pit.

2. Description of Related Art

Optical disk apparatuses such as DVD-R drives and DVD-RW drives demodulate address information which is previously formed on an optical disk for determining the address, and perform data recording/reproducing. The address information is formed in such a manner that the address information is embedded by wobbling the tracks, and also in such a manner that pre-pits are formed in lands adjacent to grooves which are information recording tracks. Here, in DVD-RAMs in which both lands and grooves are information recording tracks, the address information is embedded in an embossed portion of an area formed by the embossed portion and a data portion. The present application will be described in consideration of a land pre-pit (LPP) which is formed in lands.

The land pre-pits LLPs will be described first.

One ECC block is composed of sixteen sectors 0 to 15, and each sector is composed of a total of twenty-six frames 0 to 25. These twenty-six frames can include even frames and odd frames. Generally, an LPP is disposed at the top of an even frame. However, the LPP may be disposed in the odd frames, not in the even frames, depending on the state of the adjacent track. Each LPP is composed of 3-bit data and is formed at the top of each of the thirteen frames. Consequently, in one sector, the LPPs are formed by thirteen pieces of information each having 3-bit data. For example, LPP data "111" is recorded in the 0th frame in the 0th sector, and LPP data "10X" is recorded in the 10th frame. Here, "100" represents a data value 0, and "101" represents a data value 1. The 0th to the eighth frames are areas for defining the address, while the remaining frames are used as user data, which is defined at the factory shipment of an optical disk.

A wobble signal, on the other hand, is formed by wobbling the grooves which are information recording tracks at a predetermined frequency (140 kHz), and each bit of the LPP is formed in synchronization with the peak of a wobble signal. The LPP is thus formed in synchronization with a wobble signal, and when detecting LPP from an optical disk, light reflected from the optical disk is received by a light receiving element of an optical pickup, and a reproduction signal (obtained by superimposing a wobble signal and an LPP signal) is binarized using a threshold value. As the LPP signal is superimposed on the wobble signal whose amplitude changes, the LPP signal level also changes in accordance with the change in the amplitude of the wobble signal. It is therefore difficult to extract an LPP signal correctly when a fixed threshold value is used for binarization. In order to deal with this problem, Japanese Patent Laid-Open Publications Nos. 2002-279642, 2003-59184, and 2003-91819 disclose, for example, technology in which a gate is opened only during a predetermined period in which a wobble signal has a maximum amplitude and an LPP signal is caused to pass through only when the gate is opened.

When data is recorded, synchronization information having a length of 14T (T indicates a reference signal length) is recorded at the top of each frame. According to the specification of DVD-R or the like, it is possible to select, as the 14T synchronization information, either a mark (i.e. a pit is formed by irradiation of laser light of recording power) or a space (i.e. only laser light of reproducing power is irradiated and a pit is not formed). When the mark is selected as the synchronization information, however, problems arise that such a mark affects LPP at the time of recording the mark and that LPP is affected by the mark when reproducing the LPP.

More specifically, LPP is formed in synchronization with the peak of a wobble signal as described above, and an LPP signal is superimposed on the peak of a wobble signal. It is possible to extract an LPP signal by means of an appropriate binary threshold value or window setting as long as the LPP signal has a sufficient level. When a laser power which is modulated is irradiated onto an optical disk so as to record synchronization information using a mark having a length of 14T at the position of the LPP, however, in the process of forming a mark having a length 14T by irradiation of the laser power, heat is diffused to the adjacent land, which may cause deformation of the LPP in the adjacent land, thereby lowering the LPP signal level. Further, when reproducing the synchronization information which has been recorded with a mark having a length of 14T, with the LLP signal being superimposed with a wobble signal, the LPP signal may be deformed under influence of recording of a mark having a length of 14T, thereby lowering the LPP signal level. In addition, as a mark portion having a length of 14T forms a pit, the reflectively of this portion itself is also decreased, which further makes it difficult to extract an LPP signal from a reproduction signal.

Similar problems arise when reproducing data which has been recorded. Specifically, as the synchronization information having a length of 14T and LPP exist at the synchronized position, an LPP signal is included in the 14T portion of a reproduced signal, which may cause an error in detecting the synchronization information of 14T.

Japanese Patent Laid-Open Publication No. 2003-91819 listed above discloses technology for controlling such that marks and spaces are arranged alternately as the synchronization information so as to perform ROPC (Running Optimum Power Control) reliably. With this technology, while it is possible to prevent effects of the marks on the LPP by controlling such that the synchronization information of the even frames are always set to spaces when the LPP is formed at the top of even frames, this cannot provide a satisfactory solution because the LPP may be disposed in the odd frames.

SUMMARY OF THE INVENTION

The present invention advantageously provides an optical disk apparatus capable of detecting land pre-pits in a reliable manner to obtain address information and also reproducing recorded data reliably, when data recording and reproducing is performed with respect to an optical disk having land pre-pits.

In accordance with one aspect of the present invention there is provided an optical disk apparatus for recording data on an optical disk, comprising synchronization control means which sets a polarity of synchronization information of each of the i-th frame (wherein i is an integer which is 0 or greater) and the (i+1)th frame of a plurality of consecutive frames to either a mark or a space such that a digital sum value (DSV) is minimized, sets a polarity of synchronization information of the (i+2)th frame to a polarity opposite to the polarity of the synchronization information of the i-th frame, and sets a polarity of the synchronization information of the (i+3)th frame to a polarity opposite to the polarity of the synchronization information of the (i+1)th frame, and an optical pickup for recording data while inserting the synchronization information which is set by the synchronization control means into each frame.

With this structure, because the synchronization information of the i-th frame and the synchronization information of the (i+2)th frame always have opposite polarities, the synchronization information of either one of the i-th frame and the (i+2)th frame is a space when the i-th frame is an even frame, as a result of which effects on land pre-pit LPP can be suppressed even if the LPP is formed in even frames. Similarly, because the synchronization information of the (i+1)th frame and the synchronization information of the (i+3)th frame also have opposite polarities all the time, the synchronization information of either one of the (i+1)th frame and the (i+3)th frame is a space, whereby effects on land pre-pit LPP can be suppressed even if the LPP is formed in odd frames. In addition, because the synchronization information of one of two frames, whether they are even frames or odd frames, is a mark, it is possible to perform ROPC at the timing of the mark. Further, as the polarities of the synchronization information of the i-th frame and the synchronization information of the (i+1)th frame are set based on the DSV, DC components can be suppressed.

In accordance with another aspect of the present invention, there is provided an optical disk apparatus for recording data on an optical disk, comprising synchronization control means which sets a polarity of synchronization information of the i-th frame (wherein i is an integer which is 0 or greater) of a plurality of consecutive frames to either a mark or a space such that a DSV is minimized, sets polarities of synchronization information of the (i+1)th frame and the (i+2)th frame to a polarity opposite to the polarity of the synchronization information of the i-th frame, and sets a polarity of the synchronization information of the (i+3)th frame to the same polarity as the polarity of the synchronization information of the i-th frame; and an optical pickup for recording data while inserting the synchronization information which is set by the synchronization control means into each frame.

With this structure, because the synchronization information of the i-th frame and the synchronization information of the (i+2)th frame always have opposite polarities, the synchronization information of either one of the i-th frame and the (i+2)th frame is a space when the i-th frame is an even frame, whereby effects on land pre-pit LPP can be suppressed even if the LPP is formed in even frames. Similarly, because the synchronization information of the (i+1)th frame and the synchronization information of the (i+3)th frame also have opposite polarities all the time, the synchronization information of either one of the (i+1)th frame and the (i+3)th frame is a space, whereby effects on land pre-pit LPP can be suppressed even if the LPP is formed in odd frames. In addition, because the synchronization information of one of two frames, whether they are even frames or odd frames, is a mark, it is possible to perform ROPC at the timing of the mark.

In accordance with still another aspect of the present invention, there is provided an optical disk apparatus for recording data on an optical disk, comprising synchronization control means which sets a polarity of synchronization information of the i-th frame (wherein i is an integer which is 0 or greater) of a plurality of consecutive frames to either a mark or a space such that a DSV is minimized, sets a polarity of synchronization information of the (i+1)th frame to the same polarity as the polarity of the synchronization information of the i-th frame, and sets polarities of the synchronization information of the (i+2)th frame and the (i+3)th frame to a polarity opposite to the polarity of the synchronization information of the i-th frame; and an optical pickup for recording data while inserting the synchronization information which is set by the synchronization control means into each frame.

With this structure, because the synchronization information of the i-th frame and the synchronization information of the (i+2)th frame always have opposite polarities, the synchronization information of either one of the i-th frame and the (i+2)th frame is a space when the i-th frame is an even frame, whereby effects on land pre-pit LPP can be suppressed even if the LPP is formed in even frames. Similarly, because the synchronization information of the (i+1)th frame and the synchronization information of the (i+3)th frame also have opposite polarities all the time, the synchronization information of either one of the (i+1)th frame and the (i+3)th frame is a space, whereby effects on land pre-pit LPP can be suppressed even if the LPP is formed in odd frames. In addition, because the synchronization information of one of two frames, whether they are even frames or odd frames, is a mark, it is possible to perform ROPC at the timing of the mark.

According to the present invention, because the synchronization information of one of two frames, whether they are even frames or odd frames, can always be set to a space, it is possible to suppress omission of LPP and a detection error of the synchronization information occurring when synchronization information is recorded as a mark at the LPP portion. Further, because the synchronization information of one of two frames, whether they are even frames or odd frames, is a mark, it is possible to perform ROPC in a reliable manner.

BRIEF DESCRIPTION OF THE DRAWINGS

Preferred embodiments of the present invention will be described in detail based on the following figures, wherein.

DETAILED DESCRIPTION OF PREFERRED EMBODIMENTS

Preferred embodiments of the present invention will be described with reference to the accompanying drawings, using a DVD-R as an example optical disk.

First Embodiment

Figure 1:
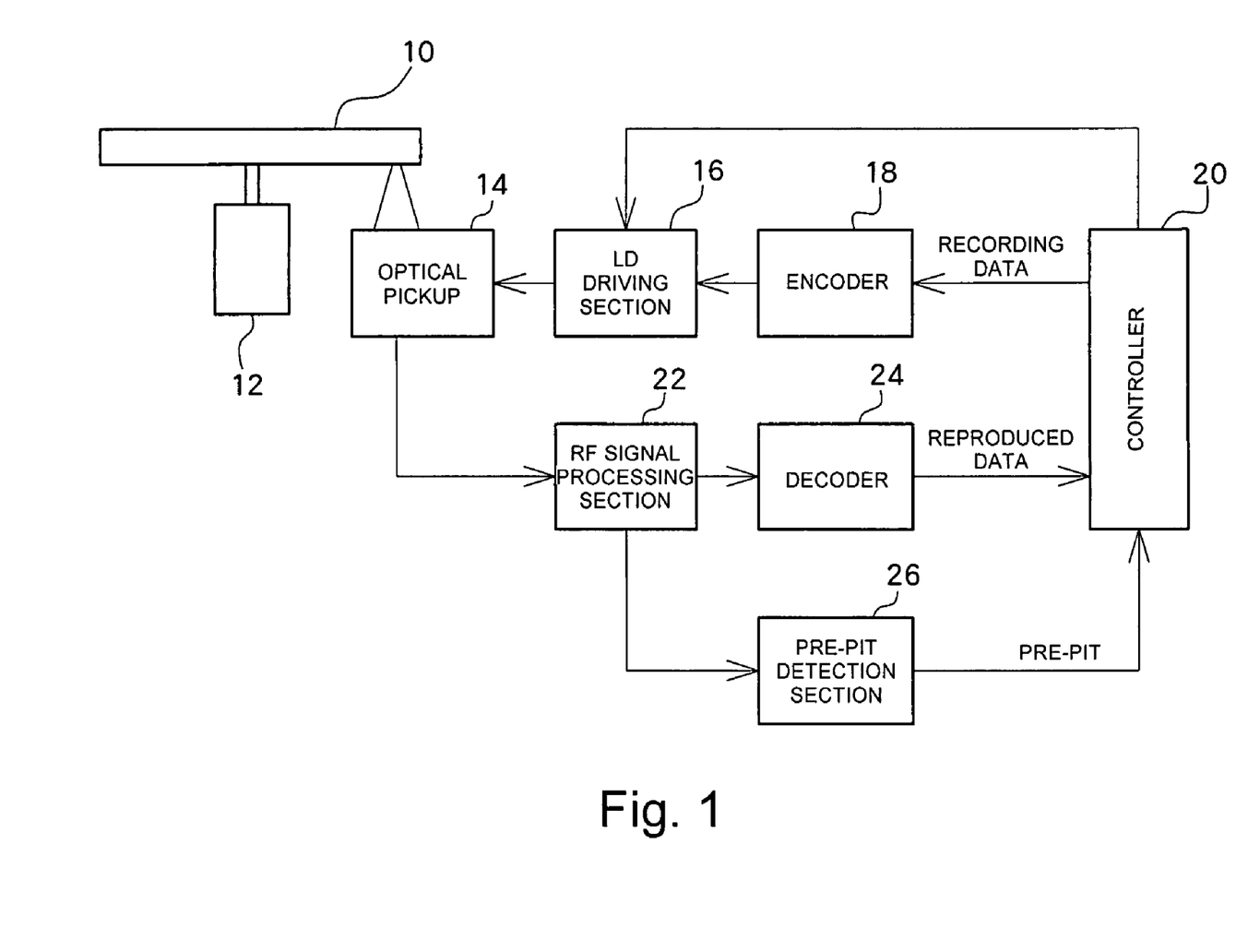
FIG. 1 is a block diagram showing a structure of an optical disk apparatus according to an embodiment of the present invention.

FIG. 1 shows a block diagram of a structure of an optical disk apparatus according to an embodiment of the present invention. An optical disk (DVD-R) is driven by a spindle motor 12 to rotate at CAV (or CLV). Pre-pits (land pre-pits) are formed at a predetermined interval in an area (a land) between grooves which are information recording tracks of the optical disk 10. The position within the plane of the optical disk 10 can be specified by detecting the pre-pits.

An optical pickup 14, which is disposed opposing the optical disk 10, irradiates laser light of a recording power onto the optical disk 10 for recording data and irradiates laser light of a reproducing power for reproducing recorded data. At the time of recording, recording data supplied from a controller 20 is modulated by an encoder 18 and the modulated data is further converted into a driving signal by an LD driving section 16 for driving a laser diode (LD) of the optical pickup 15. At the time of data reproducing, on the other hand, a quantity of return light which is converted into an electrical signal by the optical pickup 14 is supplied to an RF signal processing section 22, demodulated by a decoder 24, and supplied to the controller 20 as reproduced data.

The RF signal processing section 22 includes an amplifier or equalizer, a binarizing section, a PLL section, and the like, and binarizes an RF signal which is boosted to generate a synchronization clock, which is output to the decoder 24. The reproduced RF signal is also supplied to a pre-pit detection section 26.

The pre-pit detection section 26 detects a signal component of a pre-pit LPP formed in a land adjacent to a groove (i.e. a land adjacent to a groove on the outer peripheral side), the signal component being contained in the reproduced RF signal, and supplies the pre-pit information to the controller 20.

The controller 20, which is formed by a microcomputer or the like, supplies the recording data to the encoder 18 and also supplies the pre-pit information which is detected to the encoder 18. The encoder 18 modulates the recording data and also supplies a data signal to the LD driving section 16 while periodically inserting synchronization information based on the pre-pit detection information. The encoder 18 will be described in detail below.

While the apparatus also includes, in addition to the elements described above, a servo system for generating a focus error signal and a tracking error signal to control focus and tracking by a focusing servo and a tracking servo, such a servo system will not be described because it is the same as the conventional servo system. Further, with regard to a strategy for recording data, a recording strategy which is similar to the conventional strategy may be used. More specifically, recording pulses are superimposed at the reproduction level to form laser light of a recording power, and also a plurality of pulses (a multipulse), rather than a single recording pulse, are used for forming a single pit. Specifically, 3T is formed by a single pulse, and 4T or greater (including 14T) is formed by multipulse.

Further, the optical disk apparatus according to the present embodiment achieves optimization of a recording power by performing OPC (Optimum Power Control) and ROPC (Running Optimum Power Control). Specifically, prior to recording, the controller 20 supplies test data to the encoder 18 for recording the test data on a PCA area of the optical disk 10 while varying the recording power in a plurality of steps. Then, the recorded test data is reproduced using laser light of a reproducing power, whereby the optimum recording power is selected from a β value of a reproduced signal obtained at this time and data is recorded using the selected recording power. In addition, the controller 20 periodically detects the quantity of return light at the time of data recording and determines whether or not a level B (a reflection level after formation of a pit) matches a predetermined fixed value which is stored in a memory. When the both values do not match, the controller 20 then controls the LD driving section 16 to adjust the recording power to increase or decrease in accordance with the magnitude of the difference. In the present embodiment, ROPC is performed when a mark having a pit length of 14T which is included in the synchronization information is formed.

Figure 2:
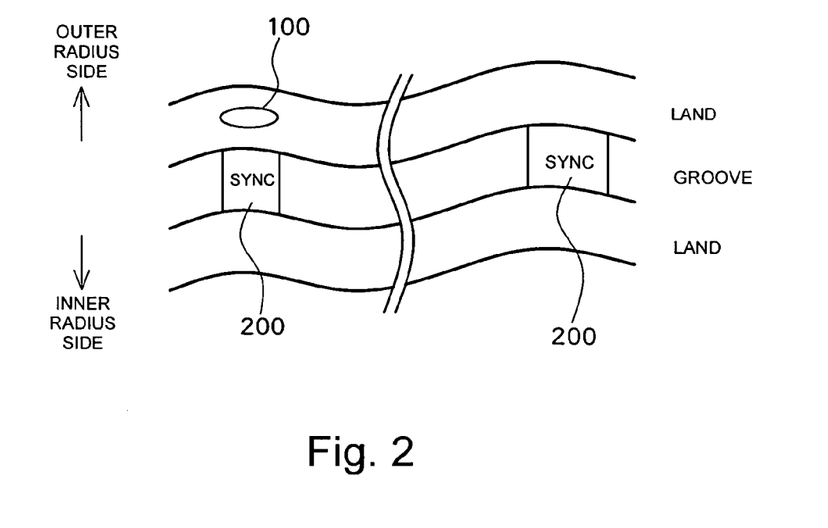
FIG. 2 is a view for explaining lands and grooves and pre-pits, and the arrangement of synchronization information.

FIG. 2 schematically shows a recording method of the optical disk 10 according to the present embodiment. As already described, the optical disk 10 includes pre-pits 100 which are formed at a predetermined interval in a land area between grooves. On the other hand, data recorded in a groove is previously divided into synchronous (SYNC) frames which are information units. Specifically, a total number of twenty-six SYNC frames, i.e. the 0th frame to the 25th frame, constitute one sector, and sixteen sectors constitute one ECC block. The synchronization information (SYNC or SY) 200 for achieving synchronization for each SYNC frame is inserted into the head of each SYNC frame. The synchronization information SYNC has a length of 14T which is sufficiently longer than the longest data length 11T which appears in the data modulation portion so as to ensure synchronization of the SYNC frames. According to the specification of DVD-R, it is possible to select either a mark or a space as the synchronization information having a data length of 14T, and the encoder 18 in the present embodiment selects the 14T synchronization information according to a predetermined rule and inserts the selected synchronization information into the data string.

In FIG. 2, the grooves are wobbled at a predetermined frequency, in order to detect rotational speed of the optical disk 10 by detecting the wobble frequency.

Figure 3:
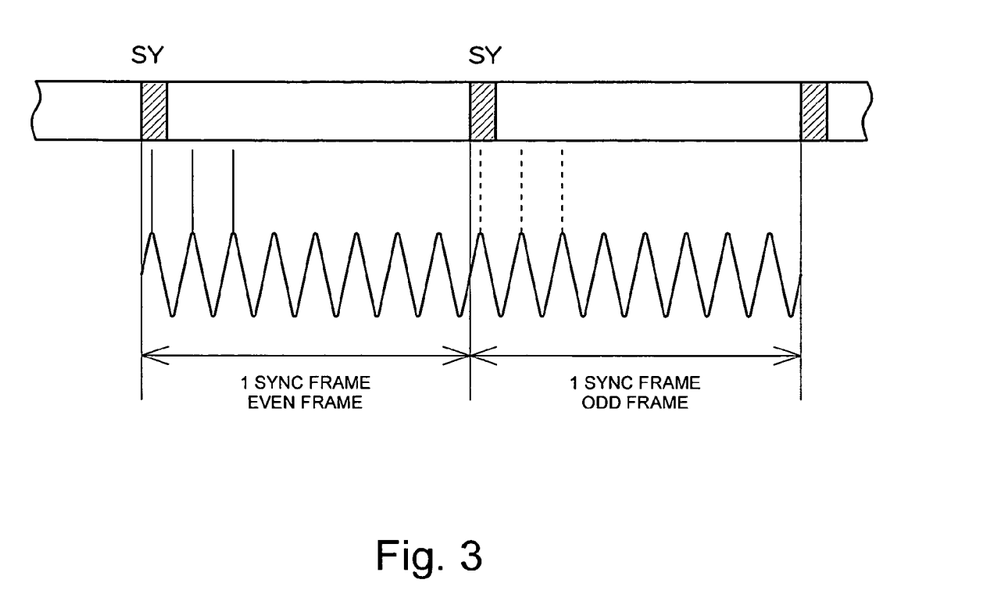
FIG. 3 is an explanatory view showing a relationship between the synchronous frame and the synchronization information.

FIG. 3 schematically shows a relationship between the SYNC frame and the synchronization information (SY), and the pre-pits. The SYNC frames roughly include even number frames (EVEN frames) and odd number frames (ODD frames), and the pre-pit is generally formed corresponding to the even frames. However, when the pre-pits are disposed in the lands adjacent to a groove to which data is to be recorded on both sides at substantially the same position, components of the two pre-pits are mixed in return light. In such a case, in order to prevent such interference, the pre-pit is shifted to the odd frames. Further, the wobble frequency is set to eight times the SYNC frame frequency, and the pre-pit is formed so as to be positioned at the first three apexes of the wobbles in a single SYNC frame. The first of these 3-bit pre-pits corresponds to an SYNC pre-pit representing a synchronous position. The optical disk apparatus can detect or predict the synchronous position by detecting this SYNC pre-pit from a reproduced signal, and records data while allocating the length 14T of the synchronization information (SYNC data) to this synchronous position.

The structure of and the process for the encoder 18 will be described.

Figure 4:
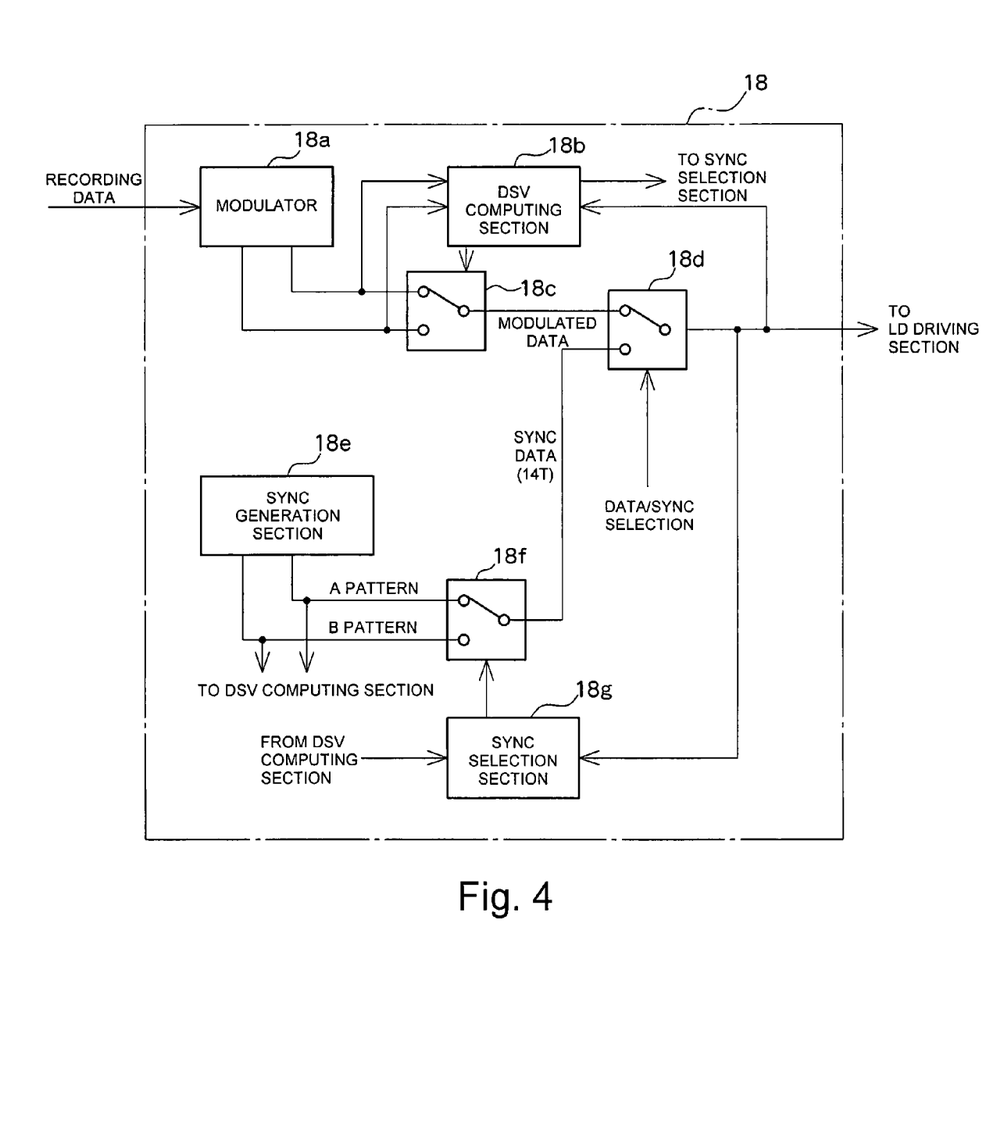
FIG. 4 is a block diagram showing the function of an encoder shown in FIG. 1.

FIG. 4 is a detailed functional block diagram of the encoder 18 shown in FIG. 1. The encoder 18 includes a modulator 18a, a DSV computing section 18b, a SYNC generation section 18e, a SYNC selection section 18g, and selection switches 18c, 18e, and 18f.

The modulator 18a subjects the recording data supplied from the controller 20 to 8-16 (eight to sixteen) conversion to thus generate a signal of 3T to 11T, and supplies the generated signal to the selection switch 18c. Here, the modulator 18a generates two types of data sets (main modulated data and sub modulated data) based on the recording data, which is supplied to the selection switch 18c. The two types of modulated data sets are generated as described above so as to allow selection of modulated data with a minimum DSV (Digital Sum Value) obtained at the DSV computing section 18b.

The DSV computing section 18b computes a modulated data system which is to be supplied to the LD driving section 16, i.e. a DSV value of the data to be recorded on the optical disk 10, and, based on this computing result, supplies a selection signal to the selection switch 18c which then selects modulated data. Here, a DSV (Digital Sum Value) is a value determined by accumulating all bits in a sequence, which take two statuses, from the top, with one status (for example, 1) of the bit sequence taken as +1 and the other status (for example, 0) of the bit sequence taken as −1. The smaller the absolute value of DVS, the smaller the low-frequency components, resulting in an improvement in recording and reproducing quality. The modulated data selected by the selection switch 18c based on the DSV value is further supplied to the selection switch 18d.

The selection switch 18d is used for switching between the modulated data and the synchronization information, and performs switching operation based on the pre-pit detection data (data/SYNC selection data) output from the controller 20 and a clock signal. Specifically, when the pre-pit detection data is supplied from the controller 20 (in the case of an even frame, for example) and a predetermined clock is counted therefrom (in the case of an odd frame, for example), it is determined that it is a time when the synchronization information is inserted and the selection switch 18d is switched to the SYNC data side for outputting the synchronization data. At any time other than that time, the selection switch 18d is switched to the modulated data side for outputting the modulated data which is supplied to the LD driving section 16. Consequently, the synchronization information can be inserted into the synchronous positions. The modulated data/SYNC output from the selection switch 18d is supplied to the LD driving section 16 after having been converted into an NRZI scheme.

The SYNC generation section 18e generates the synchronization information having a length of 14T. Specifically, the SYNC generation section 18e generates two synchronization information patterns, i.e. a pattern in which the 14T portion comes to a mark (A pattern) and a pattern in which the 14T portion comes to a space (B pattern), which are determined depending on the data portion connecting to the preceding SYNC frame, namely the immediately preceding modulated data, and supplies these patterns to the selection switch 18f.

The selection switch 18f selects one of the A pattern (mark) and the B pattern (space) under control of the SYNC selection section 18g. The SYNC selection section 18g selects a pattern in which the DSV supplied from the DSV computing section is minimized with regard to the synchronization information of the i-th and (i+1)th frames, selects a pattern in which the polarity of the synchronization information is opposite to the polarity of the synchronization information of the i-th frame with regard to the (i+2)th frame, and selects a pattern in which the polarity of the synchronization information is opposite to the polarity of the (i+1)th synchronization information with regard to the (i+3)th frame. Specifically, taking the synchronization information items of the i-th and (i+2)th frames as a pair and the synchronization information items of the (i+1)th and (i+3)th frames as another pair, the SYNC selection section 18g controls such that the polarities of each pair of the synchronization information items are opposite to each other. Here, with regard to the pair of the synchronization information items of the i-th and (i+2)th frames, for example, because the i-th synchronization information is set such that the DVS is minimized, DC components can be reduced. Further, because the polarities of synchronization information of the i-th and (i+2)th frames are always opposite to each other, either one of the synchronization information is always a mark, for which ROPC can be performed. On the contrary, because either one of the synchronization information is always a space, interference with LPPs can be inhibited when the i-th and (i+2)th frames are even frames. Even when LPPs are located in odd frames, effects on the LPPs can be similarly reduced because the synchronization information of the (i+1)th and (i+3)th is a space once every two times. The synchronization information output from the selection switch 18f is supplied to the above-described selection switch 18d and is inserted in a synchronous position.

Figure 5:
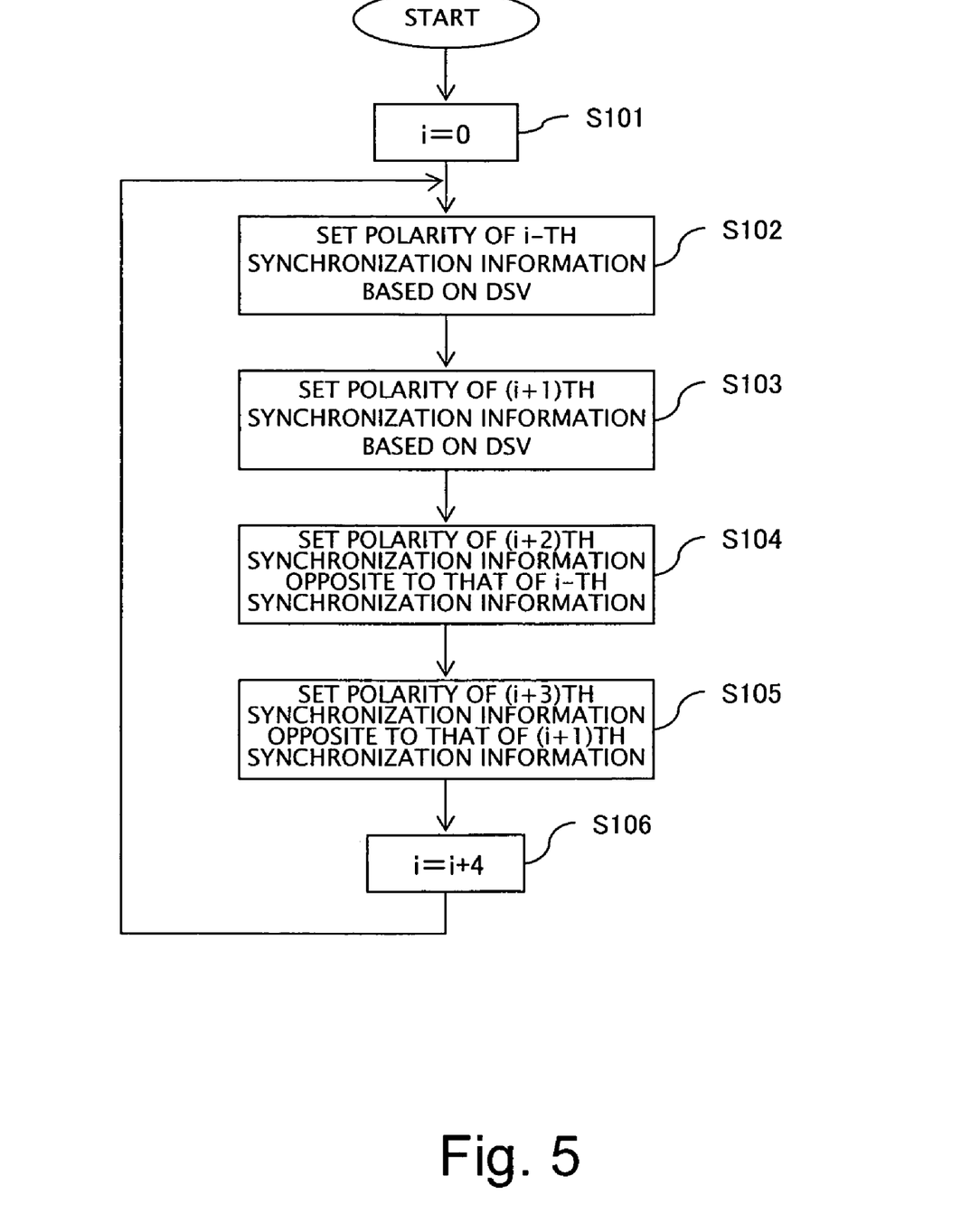
FIG. 5 is a flowchart of a process according to a first embodiment of the present invention.

FIG. 5 shows a flowchart of a process in the SYNC selection section 18g in the encoder 18.

First, the frame number i is initialized to 0 (S101), and the polarity of the synchronization information of the i-th frame (i.e. the i-th synchronization information) is set such that DSV is minimized (S102). Consequently, the 14T synchronization information of the 0th frame is set to a mark, for example. Then, with regard to the synchronization information of the (i+1)th frame (the (i+1)th synchronization information), the polarity is set such that DSV is minimized (S103). Thus, the 14T synchronization information of the 1st frame is set to a space, for example. Then, the polarity of the (i+2)th synchronization information is set opposite to the polarity of the i-th synchronization information (S104). Thus, the 14T synchronization information of the second frame is set to a space which is a polarity opposite to that of the 0th frame, when the synchronization information of the 0th frame is a mark. Next, the polarity of the (i+3)th synchronization information is set opposite to the polarity of the (i+1)th synchronization information (S105). Consequently, the 14T synchronization information of the third frame is set to a mark which is a polarity opposite to that of the first frame, when the synchronization information of the first frame is a space. After the polarities of four consecutive items of synchronization information are set to either a mark or a space as described above, the frame number is incremented by 4, and then the processes of steps S102 to S105 are repeated.

Figure 6:
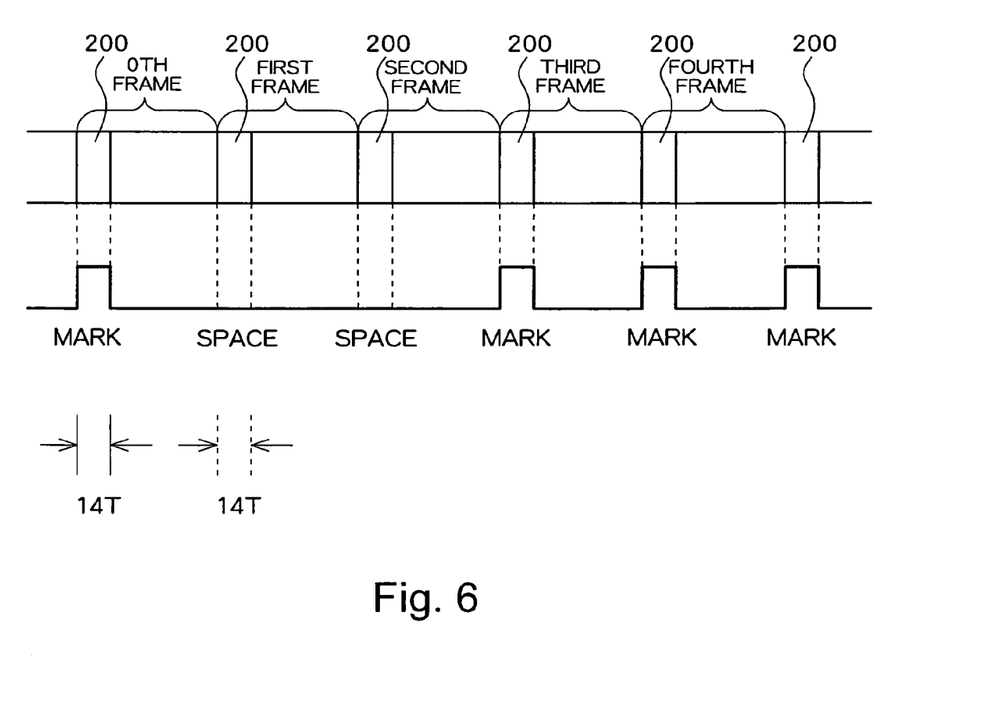
FIG. 6 is a view for explaining the synchronization information pattern of the first embodiment.

FIG. 6 shows the synchronization information 200 having a length of 14T which is set as described above. As shown, the synchronization information of the 0th frame is set to a mark, the synchronization information of the first frame is set to a space, the synchronization information of the second frame is set to a space, the synchronization information of the third frame is set to a mark, and the synchronization information of the fourth and fifth frames is set to a mark such that DSV is minimized. Assuming that the 0th frame and the second frame are even frames in which LPPs are formed, because the synchronization information of these two frames is set to a mark and a space, respectively, i.e. the synchronization information of one of the two even frames is necessarily a space, the effects of LPPs can be reduced. Stated specifically, omission of LPPs can be prevented in the space portion and also the 14T synchronization information can be reproduced reliably. Further, assuming that the first frame and the third frame are odd frames in which LPPs are not formed, because the synchronization information of these two frames are set to a space and a mark, respectively, i.e. the synchronization information of one of the two odd frames is necessarily a mark, ROPC can be performed in this mark portion. Here, it is of course possible to perform ROPC in the mark portion of the synchronization information in an even frame. Even when LPP is formed in an odd frame, the effects of LPP can be prevented in a similar manner because the synchronization information of one of two odd frames is set to a space. In addition, because the polarities of the synchronization information items of the i-th and (i+1)th frames are set such that DSV is minimized and the polarities of the synchronization information items of the remaining (i+2)th and (i+3)th frames are set in accordance with the polarities of the synchronization information items of the i-th and (i+1)th frames, randomness in generation of patterns of synchronization information can be secured and the reduction in the number of rewrite operations can be suppressed when this technology is applied to a DVD-RW optical disk. Of course, the DSV will not be dispersed because the polarity of the synchronization information in at least one of three consecutive frames is set such that DSV is minimized.

The following patterns of polarities can be generated in the synchronization information in the present embodiment, for example:

Mark→space→space→mark→space→space→mark→mark;
Space→mark→mark→space→mark→space→space→mark;
Mark→mark→space→space→mark→mark→space→space;
or
Space→space→mark→mark→mark→mark→space→space According to the present embodiment, because the polarity of the synchronization information is set assuming the synchronization information of the i-th frame and the synchronization information of the (i+2)-th frame to be a pair and assuming the synchronization information of the (i+1)-th frame and the synchronization information of the (i+3)-th frame to be another pair, whether or not the i-th frame is an odd frame or an even frame is not considered. It is therefore not necessary to identify whether the present frame is an odd frame or an even frame in the SYNC selection section 18g.

Second Embodiment

Figure 7:
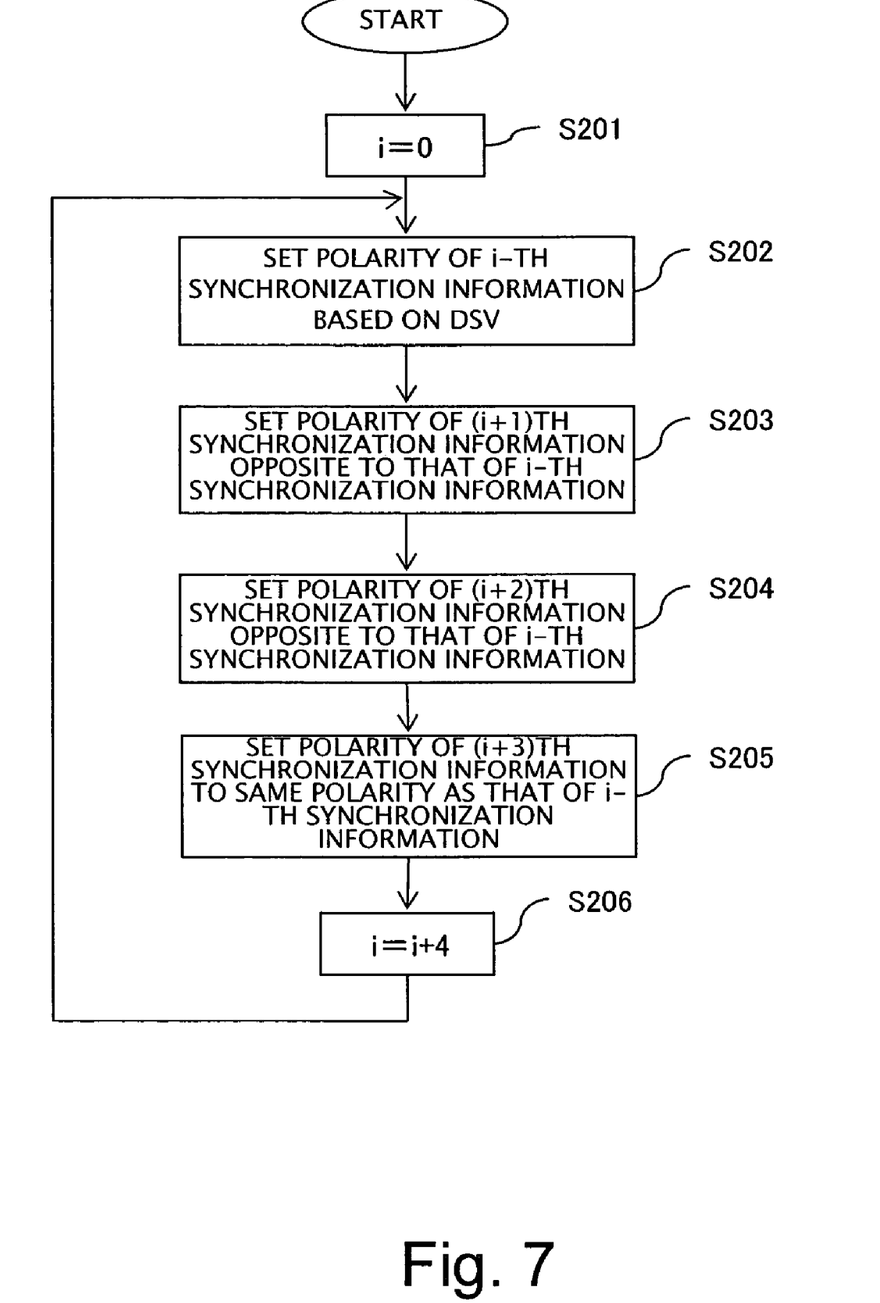
FIG. 7 is a flowchart of a process according to a second embodiment of the present invention.

FIG. 7 shows a flowchart of another process in the SYNC selection section 18g in the encoder 18. In this embodiment, four consecutive frames constitute one unit, in which the synchronization information of the first of the four consecutive frames is set based on the DSV value and the synchronization information items of the remaining frames are then set based on the polarity of the synchronization information of the first frame.

First, the frame number i is initialized to 0 (S201), and the polarity of the i-th synchronization information is set such that DSV is minimized (S202). Consequently, the 14T synchronization information of the 0th frame is set to a space, for example. Then, with regard to the (i+1)th synchronization information, the polarity is set opposite to that of the i-th synchronization information (S203). Thus, the 14T synchronization information of the first frame is set to a mark, for example. Then, the polarity of the (i+2)th synchronization information is also set opposite to the polarity of the i-th synchronization information (S204). Thus, the 14T synchronization information of the second frame is also set to a mark. Next, the polarity of the (i+3)th synchronization information is set to the same polarity as the polarity of the i-th synchronization information (S205). Consequently, the 14T synchronization information of the third frame is set to a space. After the polarities of four consecutive items of synchronization information are set to either a mark or a space as described above, the frame number is incremented by 4, and then the processes of steps S202 to S205 are repeated.

Figure 8:
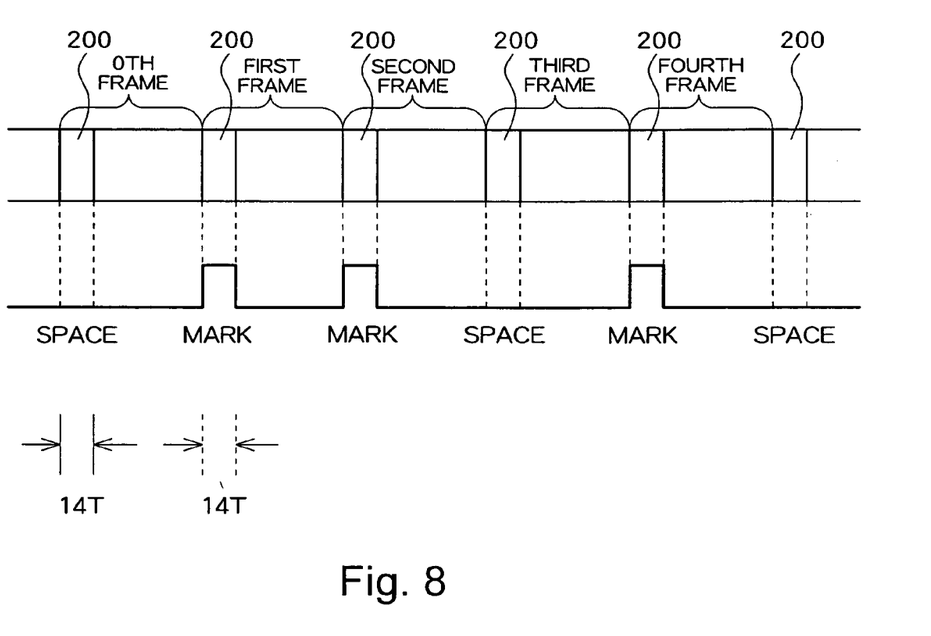
FIG. 8 is a view for explaining the synchronization information pattern of the second embodiment.

FIG. 8 shows the synchronization information 200 having a length of 14T which is set as described above. As shown, the synchronization information of the 0th frame is set to a space, the synchronization information of the first frame is set to a mark, the synchronization information of the second frame is set to a mark, the synchronization information of the third frame is set to a space, the synchronization information of the fourth frame is set to a mark such that DSV is minimized, and the synchronization information of the fifth frame is set to a space which is a polarity opposite to that of the fourth frame. Assuming that the 0th frame and the second frame are even frames in which LPPs are formed, because the synchronization information items of these frames are set to a space and a mark, respectively, i.e. the synchronization information of one of the two even frames is necessarily a space, the effects of LPPs can be reduced. Stated specifically, omission of LPPs can be prevented in the space portion and also the 14T synchronization information can be reproduced reliably. Further, assuming that the first frame and the third frame are odd frames in which LPPs are not formed, because the synchronization information items of these two frames are set to a mark and a space, respectively, i.e. the synchronization information of one of the two odd frames is necessarily a mark, ROPC can be performed in this mark portion. Here, it is of course possible to perform ROPC in the mark portion of the synchronization information in an even frame. Even when LPP is formed in an odd frame, the effects of LPP can be prevented in a similar manner because the synchronization information of one of two odd frames is always set to a space. In addition, because the polarity of the synchronization information of the i-th frame is set such that DSV is minimized and the polarities of the synchronization information items of the remaining (i+1)th to (i+3)th frames are set in accordance with the polarity of the synchronization information of the i-th frame, the randomness in generation of patterns of synchronization information can be secured to a certain extent and reduction in the number of rewrite operations can be suppressed when this technology is applied to a DVD-RW optical disk. Further, dispersion of the DSV can be suppressed because the polarity of the synchronization information in one of four consecutive frames is set such that DSV is minimized.

The following patterns of polarities can be generated in the synchronization information in the present embodiment, for example:

Mark→space→space→mark→space→mark→mark→space;
Space→mark→mark→space→mark→space→space→mark;
Mark→space→space→mark→mark→space→space→mark;
or
Space→mark→mark→space→space→mark→mark→space As in the first embodiment, according to the second embodiment, whether the i-th frame is an odd frame or an even frame is not considered. It is therefore not necessary to identity whether the present frame is an odd frame or an even frame in the SYNC selection section 18g.

Third Embodiment

Figure 9:
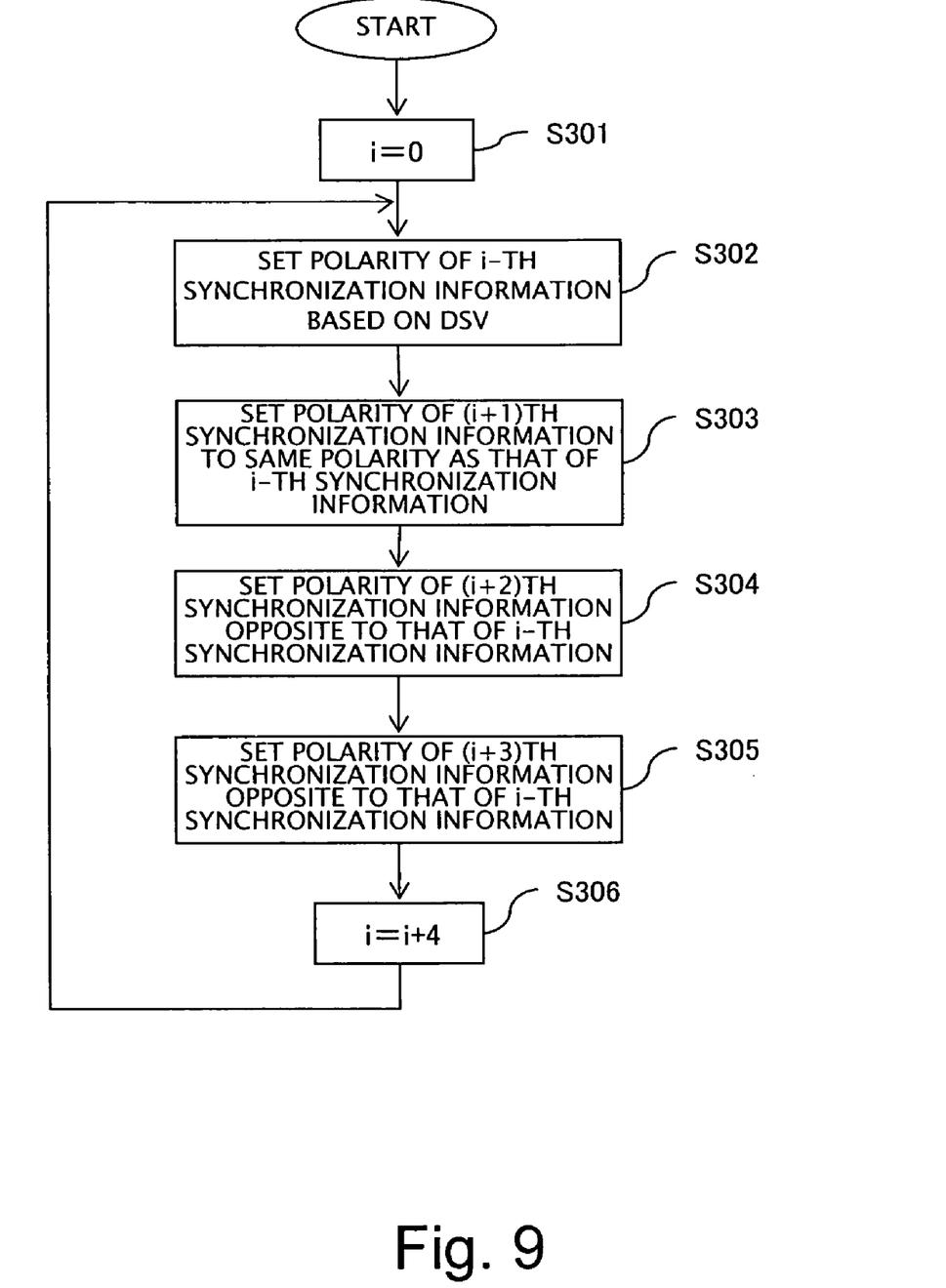
FIG. 9 is a flowchart of a process according to a third embodiment of the present invention.

FIG. 9 shows a flowchart of still another process in the SYNC selection section 18g in the encoder 18. In this embodiment, four consecutive frames constitute one unit, in which the synchronization information item of the first of the four consecutive frames is set based on the DSV value and the synchronization information items of the remaining frames are then set based on the polarity of the synchronization information of the first frame.

First, the frame number i is initialized to 0 (S301), and the polarity of the i-th synchronization information is set such that DSV is minimized (S302). Consequently, the 14T synchronization information of the 0th frame is set to a space, for example. Then, the (i+1)th synchronization information is set to the same polarity as that of the i-th synchronization information (S303). Thus, the 14T synchronization information of the 1st frame is set to a space, for example. Then, the polarity of the (i+2)th synchronization information is set opposite to the polarity of the i-th synchronization information (S304). Thus, the 14T synchronization information of the second frame is set to a mark. Next, the polarity of the (i+3)th synchronization information is set opposite to the polarity of the i-th synchronization information (S305). Consequently, the 14T synchronization information of the third frame is set to a mark. After the polarities of four consecutive items of synchronization information are set to either a mark or a space as described above, the frame number is incremented by 4, and then the processes of steps S302 to S305 are repeated.

Figure 10:
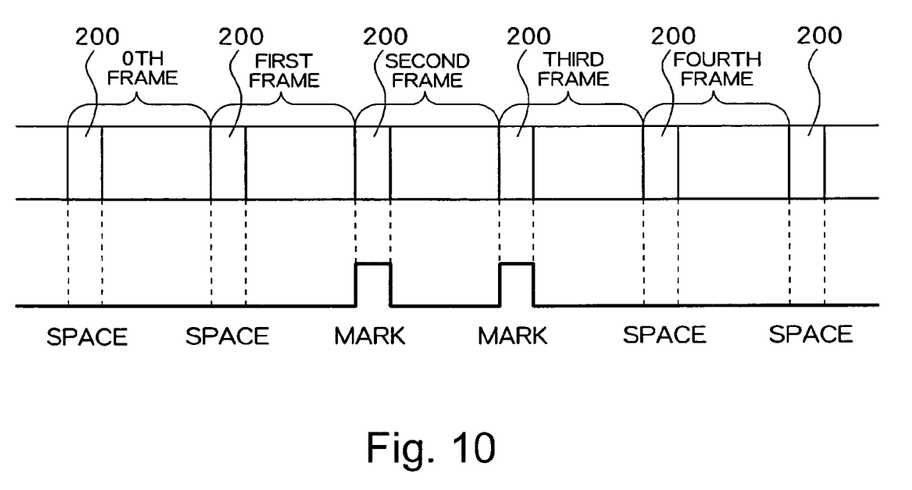
FIG. 10 is a view for explaining the synchronization information pattern of the third embodiment.

FIG. 10 shows the synchronization information 200 having a length of 14T which is set as described above. As shown, the synchronization information of the 0th frame is set to a space, the synchronization information of the first frame is set to a space, the synchronization information of the second frame is set to a mark, the synchronization information of the third frame is set to a mark, the synchronization information of the fourth frame is set to a space such that DSV is minimized, and the synchronization information of the fifth frame is set to a space which is the same polarity as that of the fourth frame. Assuming that the 0th frame and the second frame are even frames in which LPPs are formed, because the synchronization information items of these two frames are set to a space and a mark, respectively, i.e. the synchronization information of one of the two even frames is necessarily a space, the effects of LPPs can be reduced. Stated specifically, omission of LPPs can be prevented in the space portion and also the 14T synchronization information can be reproduced reliably. Further, assuming that the first frame and the third frame are odd frames in which LPPs are not formed, because the synchronization information items of these two frames are set to a space and a mark, respectively, i.e. the synchronization information of one of the two odd frames is necessarily a mark, ROPC can be performed in this mark portion. Here, it is of course possible to perform ROPC in the mark portion of the synchronization information in an even frame. Even when LPP is formed in an odd frame, the effects of LPP can be prevented in a similar manner because the synchronization information of one of two odd frames is always set to a space. In addition, because the polarity of the synchronization information of the i-th frame is set such that DSV is minimized and the polarities of the synchronization information items of the remaining (i+1)th to (i+3)th frames are set in accordance with the polarity of the synchronization information of the i-th frame, the randomness in generation of patterns of synchronization information can be secured to a certain extent and reduction in the number of rewrite operations can be suppressed when this technology is applied to a DVD-RW optical disk. Further, dispersion of the DSV can be suppressed because the polarity of the synchronization information in one of four consecutive frames is set such that DSV is minimized.

The following patterns of polarities can be generated in the synchronization information in the present embodiment, for example:

Space→space→mark→mark→space→space→mark→mark; or

Mark→mark→space→space→space→space→mark→mark.

One with ordinary skill in the art will easily conceive other patterns.

While the preferred embodiments of the present invention have been described using specific terms, such description is for illustrative purposes only, and it is to be understood that changes and variations may be made without departing from the spirit or scope of the appended claims.

What is claimed is:

1. An optical disk apparatus for recording data on an optical disk, comprising:
    synchronization control means which sets a polarity of synchronization information of each of the i-th frame (wherein i is an integer which is 0 or greater) and the (i+1)th frame of a plurality of consecutive frames to either a mark or a space such that a DSV is minimized, sets a polarity of synchronization information of the (i+2)th frame to a polarity opposite to the polarity of the synchronization information of the i-th frame, and sets a polarity of synchronization information of the (i+3)th frame to a polarity opposite to the polarity of the synchronization information of the (i+1)th frame; and
    an optical pickup for recording data while inserting the synchronization information which is set by the synchronization control means into each frame.

2. An optical disk apparatus for recording data on an optical disk, comprising:
    synchronization control means which sets a polarity of synchronization information of the i-th frame (wherein i is an integer which is 0 or greater) of a plurality of consecutive frames to either a mark or a space such that a DSV is minimized, sets polarities of synchronization information of the (i+1)th frame and the (i+2)th frame to a polarity opposite to the polarity of the synchronization information of the i-th frame, and sets a polarity of synchronization information of the (i+3)th frame to the same polarity as the polarity of the synchronization information of the i-th frame; and
    an optical pickup for recording data while inserting the synchronization information which is set by the synchronization control means into each frame.

3. An optical disk apparatus for recording data on an optical disk, comprising:
    synchronization control means which sets a polarity of synchronization information of the i-th frame (wherein i is an integer which is 0 or greater) of a plurality of consecutive frames to either a mark or a space such that a DSV is minimized, sets a polarity of synchronization information of the (i+1)th frame to the same polarity as the polarity of the synchronization information of the i-th frame, and sets polarities of the synchronization information of the (i+2)th frame and the (i+3)th frame to a polarity opposite to the polarity of the synchronization information of the i-th frame; and
    an optical pickup for recording data while inserting the synchronization information which is set by the synchronization control means into each frame.

4. An optical disk apparatus according to claim 1, wherein the synchronization control means includes:
    modulation means for modulating data to be recorded on the optical disk;
    DSV calculation means for calculating a DSV value of modulated data supplied from the modulation means;
    synchronization information generation means for generating synchronization information having a polarity of a mark and synchronization information having a polarity of a space; and
    synchronization information selection means which, with regard to each of the i-th frame and the (i+1)th frame, selects and outputs either one of the synchronization information having a polarity of a mark and the synchronization information having a polarity of a space generated by the synchronization information generation means in accordance with a DSV value obtained from the DSV calculation means, and, with regard to the (i+2)th frame and the (i+3)th frame, selects and outputs either one of the synchronization information having a polarity of a mark and the synchronization information having a polarity of a space generated by the synchronization information generation means in accordance with the polarities of the synchronization information of the i-th frame and the (i+1)th frame, respectively.

5. An optical disk apparatus according to claim 2, wherein the synchronization control means includes:

modulation means for modulating data to be recorded on the optical disk;

DSV calculation means for calculating a DSV value of modulated data supplied from the modulation means;

synchronization information generation means for generating synchronization information having a polarity of a mark and synchronization information having a polarity of a space; and synchronization information selection means which, with regard to the i-th frame, selects and outputs either one of the synchronization information having a polarity of a mark and the synchronization information having a polarity of a space generated by the synchronization information generation means in accordance with a DSV value obtained from the DSV calculation means, and, with regard to each of the (i+1)th frame, the (i+2)th frame, and the (i+3)th frame, selects and outputs either one of the synchronization information having a polarity of a mark and the synchronization information having a polarity of a space generated by the synchronization information generation means in accordance with the polarity of the synchronization information of the i-th frame.

6. An optical disk apparatus according to claim 3, wherein the synchronization control means includes:

modulation means for modulating data to be recorded on the optical disk;

DSV calculation means for calculating a DSV value of modulated data supplied from the modulation means;

synchronization information generation means for generating synchronization information having a polarity of a mark and synchronization information having a polarity of a space; and synchronization information selection means which, with regard to the i-th frame, selects and outputs either one of the synchronization information having a polarity of a mark and the synchronization information having a polarity of a space generated by the synchronization information generation means in accordance with a DSV value obtained from the DSV calculation means, and, with regard to each of the (i+1)th frame, the (i+2)th frame, and the (i+3)th frame, selects and outputs either one of the synchronization information having a polarity of a mark and the synchronization information having a polarity of a space generated by the synchronization information generation means in accordance with the polarity of the synchronization information of the i-th frame.

\* \* \* \* \*